US012072982B2

United States Patent
Suryanarayana et al.

(10) Patent No.: US 12,072,982 B2
(45) Date of Patent: Aug. 27, 2024

(54) PRE-AUTHORIZED VIRTUALIZATION ENGINE FOR DYNAMIC FIRMWARE MEASUREMENT

(71) Applicant: Dell Products L.P., Round Rock, TX (US)

(72) Inventors: Shekar Babu Suryanarayana, Bangalore (IN); Anand Prakash Joshi, Round Rock, TX (US); Amy Christine Nelson, Round Rock, TX (US); Nicholas D. Grobelny, Evergreen, CO (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 17/837,329

(22) Filed: Jun. 10, 2022

(65) Prior Publication Data
US 2023/0401316 A1    Dec. 14, 2023

(51) Int. Cl.
| | |
|---|---|
| H04L 29/06 | (2006.01) |
| G06F 21/54 | (2013.01) |
| G06F 21/57 | (2013.01) |
| G06F 21/60 | (2013.01) |

(52) U.S. Cl.
CPC ............ *G06F 21/572* (2013.01); *G06F 21/54* (2013.01); *G06F 21/575* (2013.01); *G06F 21/602* (2013.01)

(58) Field of Classification Search
CPC ...... G06F 21/572; G06F 21/54; G06F 21/575; G06F 21/602
See application file for complete search history.

(56) References Cited

U.S. PATENT DOCUMENTS

| | | | |
|---|---|---|---|
| 2007/0186086 A1* | 8/2007 | Lambert | G06F 8/65 |
| | | | 713/1 |
| 2020/0356400 A1* | 11/2020 | Pashenkov | G06F 9/547 |
| 2022/0291850 A1* | 9/2022 | Reed | G06F 3/067 |

FOREIGN PATENT DOCUMENTS

WO    WO-2021201929 A1 * 10/2021 ............. G06F 21/53

OTHER PUBLICATIONS

Cheng, Yueqiang. "Virtualization-based System Hardening against Untrusted Kernels." (2014). (Year: 2014).*
Zimmer, Vincent. "System Isolation Beyond BIOS using the Unified Extensible Firmware Interface." Security and Management. 2008. (Year: 2008).*
Sev-Snp, A. M. D. "Strengthening VM isolation with integrity protection and more." White Paper, Jan. 53 (2020): 1450-1465. (Year: 2020).*

* cited by examiner

*Primary Examiner* — Shawnchoy Rahman
(74) *Attorney, Agent, or Firm* — Jackson Walker L.L.P.

(57) ABSTRACT

A virtual BIOS engine may be configured to, during runtime of an operating system, in response to an operating system event for updating firmware, load onto an isolated compute domain of the processor to emulate firmware update processes of a non-transitory computer-readable media with a virtual non-transitory computer-readable media and emulate the firmware update processes of the cryptoprocessor with a virtual cryptoprocessor, extract a firmware payload to the virtual non-transitory computer-readable media, and execute a virtual trust chain to measure the firmware payload in the virtual non-transitory computer-readable media.

21 Claims, 4 Drawing Sheets

PRE-AUTHORIZED VIRTUALIZATION ENGINE FOR DYNAMIC FIRMWARE MEASUREMENT

TECHNICAL FIELD

The present disclosure relates in general to information handling systems, and more particularly to methods and systems for enabling a pre-authorized virtualization engine for dynamic firmware measurement, for use in performing a firmware update.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of modern information handling systems is the basic input/output system (BIOS). A BIOS may comprise boot firmware configured to be the first code executed by a processor of an information handling system when the information handling system is booted and/or powered on, and serves to initialize information handling resources of the information handling system and/or initialize interoperation of the information handling system with other information handling systems.

Due to its critical role in booting an information handling system and configuring various components of the information handling system for use, it is critical that an installed BIOS be a known, secure version of the BIOS, in order to reduce or eliminate potential for malicious attack.

One way to establish trust in BIOS and other firmware is a Root of Trust for Measurement (RTM), in which each firmware component is measured, and such measurement is verified prior to firmware execution. Creating an RTM involves building a trust chain when the information handling system boots, such that each firmware module is measured by the previous firmware module and extended into an event log of a cryptoprocessor of the information handling system (e.g., into a platform configuration register (PCR) of a trusted platform module (TPM)) prior to receiving control of host computing resources. A sequence and set of required measurements may be defined in a firmware profile for the cryptoprocessor, wherein a trust chain may begin at the first piece of BIOS code to execute (e.g., a Core Root of Trust for Measurement) and may end at the transition to an operating system bootloader. Attestation of the firmware measurements collected by an RTM may provide the foundation for assurance that firmware is secure.

Under traditional approaches, firmware updates within an operating system environment require a reboot into a pre-boot firmware environment to re-establish the trust chain for the RTM. After performing this reboot, the measurements of the new firmware result in a new RTM state, which may be attested or verified to re-establish trust in the information handling system. If the new RTM state resulting from the new firmware measurement in the trust chain is determined to be untrusted, the new firmware must be reverted to the "last known good" firmware by rebooting and re-flashing the firmware, causing further interruptions to productivity. In other words, no mechanism exists for calculating firmware measurements with a hash extended into the cryptoprocessor event log, without first performing a reboot.

SUMMARY

In accordance with the teachings of the present disclosure, the disadvantages and problems associated with measurement of firmware updates may be reduced or eliminated.

In accordance with embodiments of the present disclosure, an information handling system may include a processor, first non-transitory computer-readable media communicatively coupled to the processor and having stored thereon a basic input/output system (BIOS), a cryptoprocessor, and second non-transitory computer-readable media communicatively coupled to the processor and having stored thereon an operating system and a virtual BIOS engine. The virtual BIOS engine may be configured to, during runtime of the operating system, in response to an operating system event for updating firmware, load onto an isolated compute domain of the processor to emulate firmware update processes of the first non-transitory computer-readable media with a virtual non-transitory computer-readable media and emulate the firmware update processes of the cryptoprocessor with a virtual cryptoprocessor, extract a firmware payload to the virtual non-transitory computer-readable media, and execute a virtual trust chain to measure the firmware payload in the virtual non-transitory computer-readable media.

In accordance with embodiments of the present disclosure, a method may be provided for use in an information handling system having a processor, first non-transitory computer-readable media communicatively coupled to the processor and having stored thereon a basic input/output system (BIOS), a cryptoprocessor, and second non-transitory computer-readable media communicatively coupled to the processor and having stored thereon an operating system. The method may include executing a virtual BIOS engine configured to, during runtime of the operating system, in response to an operating system event for updating firmware, load onto an isolated compute domain of the processor to emulate firmware update processes of the first non-transitory computer-readable media with a virtual non-transitory computer-readable media and emulate the firmware update processes of the cryptoprocessor with a virtual cryptoprocessor, extract a firmware payload to the virtual non-transitory computer-readable media, and execute a virtual trust chain to measure the firmware payload in the virtual non-transitory computer-readable media.

In accordance with embodiments of the present disclosure, an article of manufacture may include a first non-transitory computer-readable medium having stored thereon an operating system and computer-executable instructions carried on the first computer-readable medium, the instructions readable by a processor. The instructions may be configured to, when read and executed, cause the processor to, in an information handling system having a processor, the first non-transitory computer-readable media communicatively coupled to the processor, second non-transitory computer-readable media communicatively coupled to the processors and having stored thereon a basic input/output system (BIOS), and a cryptoprocessor, execute a virtual BIOS engine during runtime of the operating system. The virtual BIOS engine may be configured to, in response to an operating system event for updating firmware, load onto an isolated compute domain of the processor to emulate firmware update processes of the second non-transitory computer-readable media with a virtual non-transitory computer-readable media and emulate the firmware update processes of the cryptoprocessor with a virtual cryptoprocessor, extract a firmware payload to the virtual non-transitory computer-readable media, and execute a virtual trust chain to measure the firmware payload in the virtual non-transitory computer-readable media.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
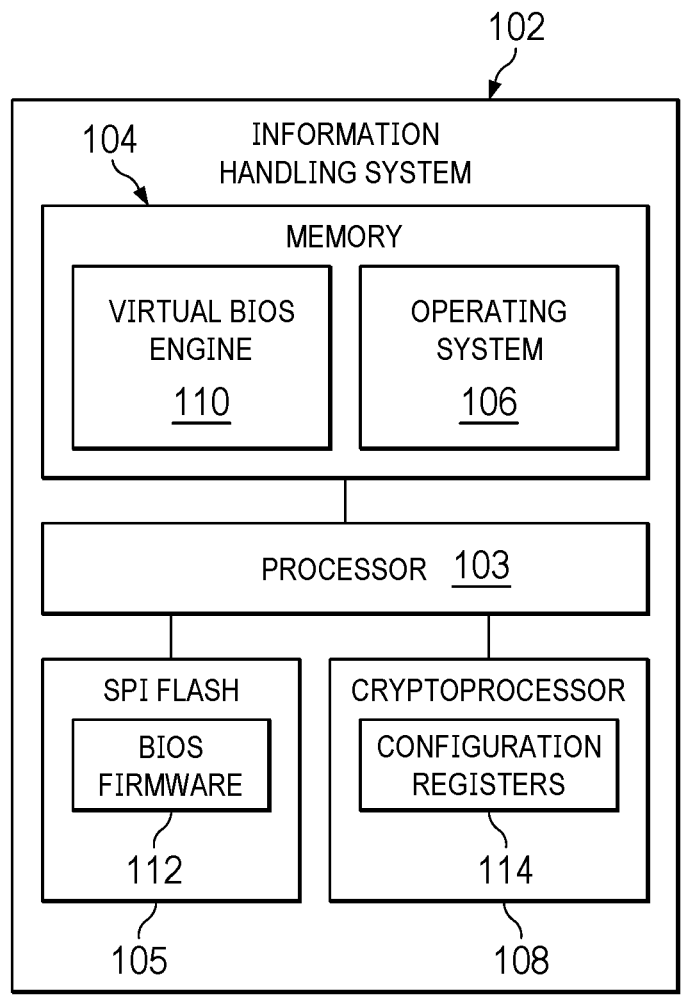
FIG. 1 illustrates a block diagram of an information handling system, in accordance with embodiments of the present disclosure.

FIG. 1 illustrates a block diagram of an example information handling system 102, in accordance with embodiments of the present disclosure. In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a Serial Peripheral Interface (SPI) flash 105 communicatively coupled to processor 103, and a cryptoprocessor 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon an operating system 106 and a virtual BIOS engine 110.

Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments, operating system 106 may be stored in storage media accessible to processor 103, and active portions of operating system 106 may be transferred from such storage media to memory 104 for execution by processor 103.

Virtual BIOS engine 110 may comprise any program of executable instructions, or aggregation of programs of executable instructions, configured to execute on top of operating system 106 in order implement an isolated virtual engine environment for staging and firmware measurement protocol (IVSFM) to measure firmware prior to update to synchronize such measurement with an event log of cryptoprocessor 108 for dynamic validation of the measurement by cryptoprocessor 108. For example, virtual BIOS engine 110 may dynamically measure, during operating system runtime, a firmware payload prior to update and tag measurement identifiers to cryptoprocessor 108 for the actual update. In addition, virtual BIOS engine 110 may be configured to execute in an isolated firmware measurement compute environment, such as an isolated hybrid processing core of processor 103, to emulate SPI flash 105 and cryptoprocessor 108 for purposes of evaluating the firmware update. Further, virtual BIOS engine 110 may dynamically compare and evaluate configuration parameters of BIOS firmware 112 and operating system 106 to ensure no power-on/self-test (POST) errors occurred in the boot path to operating system 106, as well as retaining and/or updating configuration settings.

SPI flash 105 may include any system, device, or apparatus configured to store BIOS firmware 112. As used herein, a BIOS may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, a BIOS may be implemented as a program of instructions that may be read by and executed on processor 103 to carry out the functionality of the BIOS. In these and other embodiments, the BIOS may comprise boot firmware configured to be the first code executed by processor 103 when information handling system 102 is booted and/or powered on. As part of its initialization functionality, code for the BIOS may be configured to set components of information handling system 102 into a known state, so that one or more applications (e.g., an operating system or other application programs) stored on compatible media (e.g., disk drives) may be executed by processor 103 and given control of information handling system 102.

Cryptoprocessor 108 may be communicatively coupled to processor 103 (e.g., via a suitable communication bus) and may include any system, device, or apparatus configured to carry out cryptographic operations on data communicated to it from processor 103 and/or another component of information handling system 102. In some embodiments, cryptoprocessor 108 may be compliant with the Trusted Platform Module specification, a successor specification, and/or any other similar specification. In some embodiments, cryptoprocessor 108 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys).

As shown in FIG. 1, cryptoprocessor 108 may include configuration registers 114. In some embodiments, configuration registers 114 may include platform configuration registers (PCRs) compliant with the Trusted Platform Module specification, a successor specification, and/or any other similar specification. Configuration registers 114 may be used to securely store any relevant information, including without limitation secure storage relating to measurements of a configuration of information handling system 102 and its components, for use in creating a secure chain of trust.

In addition to processor 103, memory 104, SPI flash 105, and cryptoprocessor 108, information handling system 102 may include one or more other information handling resources.

Figure 2:
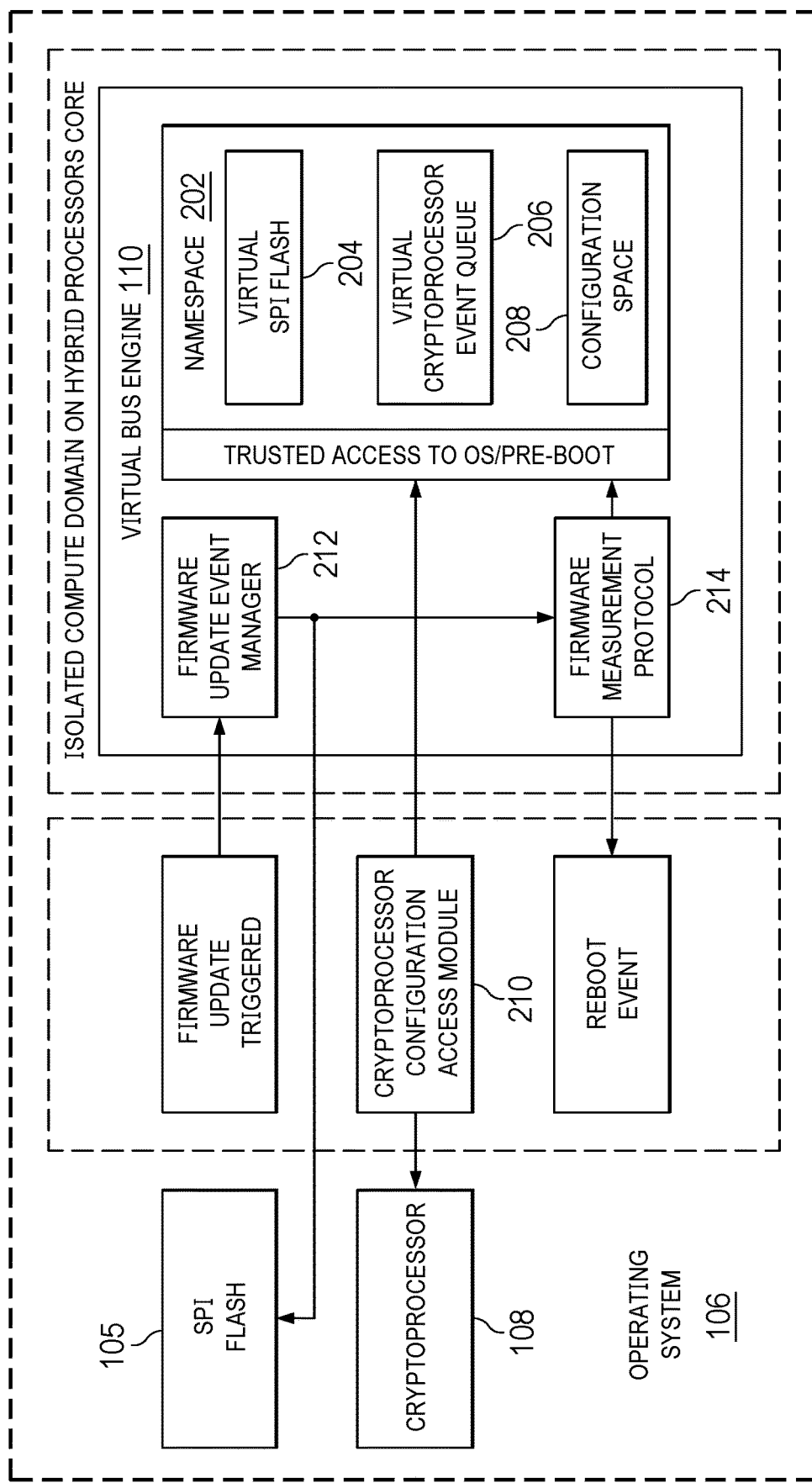
FIG. 2 illustrates a functional block diagram of a virtual BIOS engine and its interaction with other components of an information handling system, in accordance with embodiments of the present disclosure.

FIG. 2 illustrates a functional block diagram of virtual BIOS engine 110 and its interaction with other components of information handling system 102, in accordance with embodiments of the present disclosure. As shown in FIG. 2, in response to a firmware update being triggered (e.g., by an event occurring within operating system 106), virtual BIOS engine 110 may load on an isolated compute domain created on a hybrid processing core of processor 103, with permissions for secure access to resources of operating system 106. Once loaded, virtual BIOS engine 110 may execute in such isolated compute domain, and may perform staging and verification of a firmware payload by measuring the firmware code in a virtual SPI flash 204 instantiated in a secure storage namespace 202, such that virtual SPI flash 204 acts as a virtual RTM. Thus, while operating system 106 may continue to use cryptoprocessor 108 (e.g., via cryptoprocessor configuration access module 210), virtual BIOS engine 110 may extend measurement records into a virtual cryptoprocessor event queue 206 and may pass virtual cryptoprocessor event queue 206 to cryptoprocessor 108 during a subsequent boot session after firmware update. This virtual RTM may be attested (e.g., locally or remotely) prior to performing an actual physical reboot. Such attestation is beyond the scope of this disclosure.

As shown in FIG. 2, storage namespace 202 may also include a configuration space 208 for storing configuration settings that may be required to be retained and updated in order to ensure boot success with old against new configuration defaults.

In operation, in response to the firmware update trigger, a firmware update event manager 212 of virtual BIOS engine 110 may load and execute firmware measurement protocol 214. Firmware measurement protocol 214 may extract a firmware payload representing a firmware update into virtual SPI flash and perform a firmware measurement as a virtual RTM, establishing a virtual trust chain. Virtual cryptoprocessor event queue 206 may store all measurement signature identifiers for the firmware update processor to access during platform boot with the newly-updated firmware image. Thus, virtual BIOS engine 110 may implement a virtual cryptoprocessor to execute an application programming interface of cryptoprocessor 108 and the security protocol of cryptoprocessor 108 required for measurements.

Figure 3:
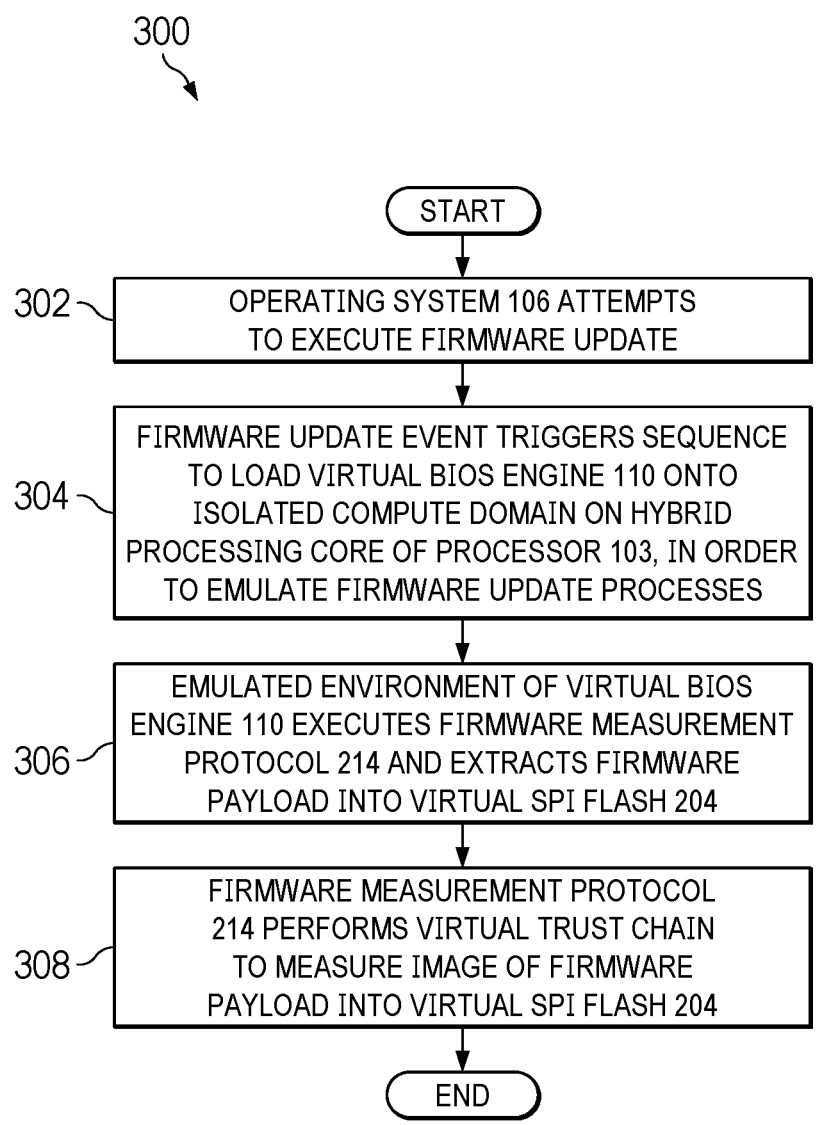
FIG. 3 illustrates a flow chart of an example method for attesting new firmware, in accordance with embodiments of the present disclosure.

FIG. 3 illustrates a flow chart of an example method 300 for attesting new firmware, in accordance with embodiments of the present disclosure. According to one embodiment, method 300 may begin at step 302. As noted above, teachings of the present disclosure may be implemented in a variety of configurations of information handling system 102.

At step 302, operating system 106 may attempt to execute a firmware update. At step 304, the firmware update event may trigger a sequence that loads virtual BIOS engine 110 onto an isolated compute domain on a hybrid processing core of processor 103, in order to emulate the firmware update processes.

At step 306, the emulated environment of virtual BIOS engine 110 may execute firmware measurement protocol 214 and extract the firmware payload into virtual SPI flash 204.

At step 308, firmware measurement protocol 214 may perform a virtual trust chain to measure the image of the firmware payload in virtual SPI flash 204. For example, by emulating a virtual cryptoprocessor, firmware measurement protocol 214 may compute hashes of each firmware volume and extend each firmware volume hash to a configuration register 114 (e.g., PCR 0). Firmware measurement protocol 214 may then perform a quote of such configuration register (e.g., using a cryptographic key created for such purpose, which is beyond the scope of this disclosure), and verify a signature of the quote with the cryptographic key. Firmware measurement protocol 214 may also attest the final state of the virtual RTM, to verify the new emulated RTM state, and verify a digest from the quote against a digest provided with the firmware update. If attestation and verification are successful, firmware measurement protocol 214 may write the pending firmware payload image to SPI flash 105.

After completion of step 308, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Figure 4:
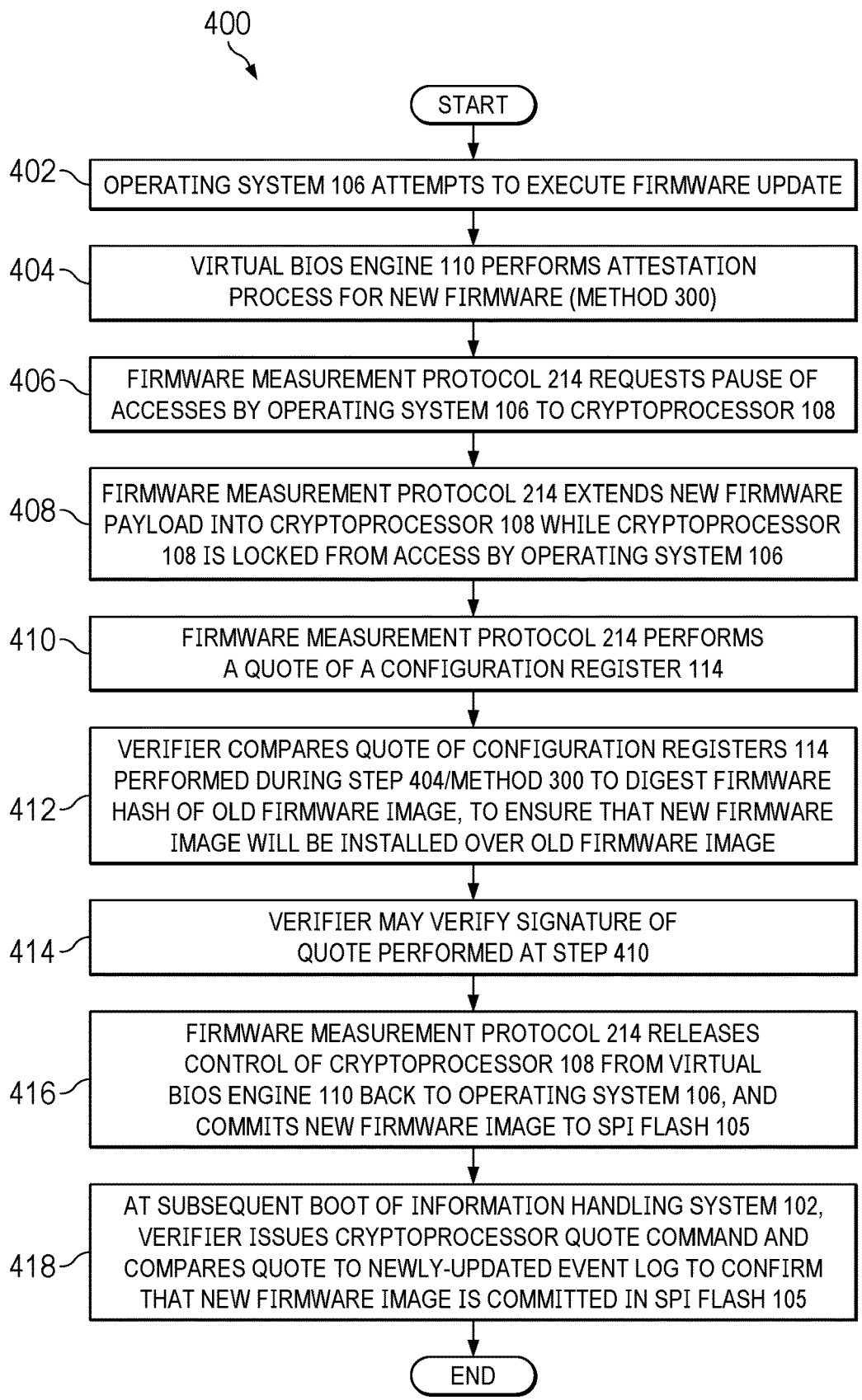
FIG. 4 illustrates a flow chart of an example method for extending new firmware and old firmware together in a cryptoprocessor to attest a firmware update process, in accordance with embodiments of the present disclosure.

FIG. 4 illustrates a flow chart of an example method 400 for extending new firmware and old firmware together in a cryptoprocessor 108 to attest a firmware update process, in accordance with embodiments of the present disclosure. According to one embodiment, method 400 may begin at step 402. As noted above, teachings of the present disclosure may be implemented in a variety of configurations of information handling system 102.

At step 402, operating system 106 may attempt to execute a firmware update. At step 404, virtual BIOS engine 110 may perform the attestation process for the new firmware, as described with respect to method 300 above.

At step 406, if the attestation process for the new firmware is successful, firmware measurement protocol 214 may request a pause of accesses by operating system 106 to cryptoprocessor 108, in order to prevent collisions between accesses by operating system 106 and accessing by virtual BIOS engine 110. For example, firmware measurement protocol 214 may call an operating system runtime service to lock the cryptoprocessor 108 for operating system access to cryptoprocessor 108 while firmware measurement protocol 214 is using cryptoprocessor 108. At step 408, firmware measurement protocol 214 may extend the new firmware payload into cryptoprocessor 108 while cryptoprocessor 108 is locked from access by operating system 106.

At step 410, firmware measurement protocol 214 may perform a quote of a configuration register 114 (e.g., PCR 0). At this point, such configuration register may include a digest of the old firmware image and the new firmware image.

At step 412, a verifier (e.g., a remote verifier coupled to a network interface of information handling system 102) may compare a quote of configuration registers 114 performed during step 404/method 300 to a digest of a firmware hash of the old firmware image, to ensure that the new firmware image will be installed over the correct old firmware image.

At step 414, a verifier (e.g., a remote verifier coupled to a network interface of information handling system 102) may verify the signature of the quote performed at step 410. For example, the verifier may calculate a hash of a concatenation of a digest from step 404/method 300 and a hash of the new firmware image, and compare such hash to the quote performed at step 410.

At step 416, if the verifications of steps 412 and 414 are successful, firmware measurement protocol 214 may release control of cryptoprocessor 108 from virtual BIOS engine 110 back to operating system 106, and commit the new firmware image to SPI flash 105.

At step 418, at a subsequent boot of information handling system 102, a verifier may issue a cryptoprocessor quote command and compare the quote to the newly-updated event log to confirm that the new firmware image is committed in SPI flash 105.

After completion of step 418, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using information handling system 102 or any other system operable to implement method 400. In certain embodiments, method 400 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   first non-transitory computer-readable media communicatively coupled to the processor and having stored thereon a basic input/output system (BIOS);
   a cryptoprocessor; and
   second non-transitory computer-readable media communicatively coupled to the processor and having stored thereon:
      an operating system; and
      a virtual BIOS engine configured to, during runtime of the operating system:
         in response to an operating system event for updating firmware, load onto an isolated compute domain of the processor to emulate firmware update processes of the first non-transitory computer-readable media with a virtual non-transitory computer-readable media and emulate the firmware update processes of the cryptoprocessor with a virtual cryptoprocessor;
         extract a firmware payload to the virtual non-transitory computer-readable media; and
         execute a virtual trust chain to measure the firmware payload in the virtual non-transitory computer-readable media.

2. The information handling system of claim 1, wherein the first non-transitory computer-readable media is a Serial Peripheral Interface flash storage device.

3. The information handling system of claim 1, wherein the cryptoprocessor is implemented in accordance with a Trusted Platform Module specification.

4. The information handling system of claim 1, the virtual BIOS engine further configured to extend measurements of the firmware payload into a configuration register of the cryptoprocessor after measuring the firmware payload, such that the configuration register includes a signature of an old firmware image to be replaced and the firmware payload.

5. The information handling system of claim 4, the virtual BIOS engine further configured to perform a quote of a configuration register.

6. The information handling system of claim 5, wherein the virtual BIOS engine is further configured to commit a new firmware image to the first non-transitory computer-readable media in response to verifying information stored in the configuration register relating to the old firmware image to be replaced and the firmware payload.

7. The information handling system of claim 1, wherein the isolated compute domain is instantiated on a securely-isolated hybrid processing core of the processor.

8. A method, in an information handling system having a processor, first non-transitory computer-readable media communicatively coupled to the processor and having stored thereon a basic input/output system (BIOS), a cryptoprocessor, and second non-transitory computer-readable media communicatively coupled to the processor and having stored thereon an operating system, the method comprising:
   executing a virtual BIOS engine configured to, during runtime of the operating system:
      in response to an operating system event for updating firmware, load onto an isolated compute domain of the processor to emulate firmware update processes of the first non-transitory computer-readable media with a virtual non-transitory computer-readable media and emulate the firmware update processes of the cryptoprocessor with a virtual cryptoprocessor;
      extract a firmware payload to the virtual non-transitory computer-readable media; and
      execute a virtual trust chain to measure the firmware payload in the virtual non-transitory computer-readable media.

9. The method of claim 8, wherein the first non-transitory computer-readable media is a Serial Peripheral Interface flash storage device.

10. The method of claim 8, wherein the cryptoprocessor is implemented in accordance with a Trusted Platform Module specification.

11. The method of claim 8, wherein the virtual BIOS engine is further configured to extend the firmware payload into a configuration register of the cryptoprocessor after measuring the firmware payload, such that the configuration register includes a signature of an old firmware image to be replaced and the firmware payload.

12. The method of claim 11, the virtual BIOS engine further configured to perform a quote of a configuration register.

13. The method of claim 12, wherein the virtual BIOS engine is further configured to commit a new firmware image to the first non-transitory computer-readable media in response to verifying information stored in the configuration register relating to the old firmware image to be replaced and the firmware payload.

14. The method of claim 8, wherein the isolated compute domain is instantiated on a securely-isolated hybrid processing core of the processor.

15. An article of manufacture comprising:
a first non-transitory computer-readable medium having stored thereon an operating system; and
computer-executable instructions carried on the first computer-readable medium, the instructions readable by a processor, the instructions, when read and executed, for causing the processor to, in an information handling system having a processor, the first non-transitory computer-readable media communicatively coupled to the processor, second non-transitory computer-readable media communicatively coupled to the processors and having stored thereon a basic input/output system (BIOS), and a cryptoprocessor:
execute a virtual BIOS engine configured to, during runtime of the operating system:
in response to an operating system event for updating firmware, load onto an isolated compute domain of the processor to emulate firmware update processes of the second non-transitory computer-readable media with a virtual non-transitory computer-readable media and emulate the firmware update processes of the cryptoprocessor with a virtual cryptoprocessor;
extract a firmware payload to the virtual non-transitory computer-readable media; and
execute a virtual trust chain to measure the firmware payload in the virtual non-transitory computer-readable media.

16. The article of claim 15, wherein the first non-transitory computer-readable media is a Serial Peripheral Interface flash storage device.

17. The article of claim 15, wherein the cryptoprocessor is implemented in accordance with a Trusted Platform Module specification.

18. The article of claim 15, the virtual BIOS engine further configured to extend the firmware payload into a configuration register of the cryptoprocessor after measuring the firmware payload, such that the configuration register includes a signature of an old firmware image to be replaced and the firmware payload.

19. The article of claim 18, the virtual BIOS engine further configured to perform a quote of the configuration register.

20. The article of claim 19, wherein the virtual BIOS engine further is configured to commit a new firmware image to the first non-transitory computer-readable media in response to verifying information stored in the configuration register relating to the old firmware image to be replaced and the firmware payload.

21. The article of claim 15, wherein the isolated compute domain is instantiated on a securely-isolated hybrid processing core of the processor.

* * * * *